(12) United States Patent
Lee

(10) Patent No.: US 11,768,832 B1
(45) Date of Patent: Sep. 26, 2023

(54) TABLE DATA STORAGE IN NON-SQL DOCUMENT STORE TO ENABLE EFFICIENT DATA ACCESS BY SQL QUERY ENGINE

(71) Applicant: Rapid7, Inc., Boston, MA (US)

(72) Inventor: Austin Lee, Burbank, CA (US)

(73) Assignee: Rapid7, Inc., Boston, MA (US)

( * ) Notice: Subject to any disclaimer, the term of this patent is extended or adjusted under 35 U.S.C. 154(b) by 208 days.

(21) Appl. No.: 17/412,349

(22) Filed: Aug. 26, 2021

(51) Int. Cl.
  *G06F 16/2453* (2019.01)
  *G06F 16/93* (2019.01)
  *G06F 16/22* (2019.01)

(52) U.S. Cl.
  CPC .... *G06F 16/24532* (2019.01); *G06F 16/2282* (2019.01); *G06F 16/93* (2019.01)

(58) Field of Classification Search
  CPC . G06F 16/24532; G06F 16/93; G06F 16/2282
  See application file for complete search history.

(56) References Cited

U.S. PATENT DOCUMENTS

| | | | |
|---|---|---|---|
| 11,327,970 B1* | 5/2022 | Li | G06F 16/24549 |
| 2003/0014393 A1* | 1/2003 | Kabra | G06F 16/24532 |
| 2014/0337064 A1* | 11/2014 | Weissman | G06Q 30/0627 705/5 |
| 2015/0154259 A1* | 6/2015 | Keeton | G06F 16/2455 707/769 |
| 2018/0137176 A1* | 5/2018 | Geissinger | G06F 16/24561 |
| 2020/0050694 A1* | 2/2020 | Avalani | G06F 16/2455 |
| 2020/0409949 A1* | 12/2020 | Saxena | G06F 9/505 |
| 2021/0133193 A1* | 5/2021 | McConnell | G06F 16/24542 |

* cited by examiner

*Primary Examiner* — Alford W Kindred
*Assistant Examiner* — Tiffany Thuy Bui
(74) *Attorney, Agent, or Firm* — Ashwin Anand; Lei Sun

(57) ABSTRACT

A SQL database system is disclosed for reading and writing a non-SQL document store using SQL. The database system includes a SQL query engine configured to use different types of dynamically loadable connectors adapted to communicate with the non-SQL document store via its data access interface. The connectors may include a first connector that treats data within an individual document in the document store as multiple table rows, and a second connector that treats individual documents as individual table rows. In some embodiments, both types of document access modes may be implemented by a single multi-modal connector. In some embodiments, the connector may enable a table to be stored across multiple documents and provide the document identifier of the documents as an attribute of the table. Advantageously, by allowing multiple rows to be stored in individual documents, a table can be stored using less storage space and accessed more efficiently.

18 Claims, 10 Drawing Sheets

TABLE DATA STORAGE IN NON-SQL DOCUMENT STORE TO ENABLE EFFICIENT DATA ACCESS BY SQL QUERY ENGINE

BACKGROUND

Distributed SQL query engines such as PRESTO and TRINO can be used to provide a SQL interface for a variety of non-SQL document databases such as ELASTIC SEARCH and MONGODB. Typically, when a document store is used as the underlying storage layer, the SQL query engine will treat each document in the document store as a single table row. While this is a straightforward way to store table data for some types of applications, this storage model has a number of disadvantages. For example, when reading a large table, the SQL query engine may need to download many documents for a single query. This potentially generates a large amount of network traffic and calls within the document store (e.g. to open and read each document), which increases system resource usage and response time for the query. In some cases, if a query exceeds a usage limit of the document store (e.g. a maximum number of documents that can be fetched), the query will simply fail. Table writes can also be hampered by this storage model. For example, when a child table is updated based on a predicate condition in the parent table, the SQL querying engine must keep track of a large number of relationships between the parent documents (each a parent table row) and child documents (each a child table row) in order to determine which child documents are to be updated. Such an update can require many API calls to the document store, which can cause the update to perform badly or become untenable for large tables. Better strategies are needed for storing SQL table data in a non-SQL document store to enable more efficient reading and writing of the table data.

SUMMARY OF EMBODIMENTS

The systems and methods described herein may be employed in various combinations and embodiments to implement a SQL database system for accessing a non-SQL document store using SQL. In some embodiments, the SQL database system includes a SQL query engine configured to use different types of dynamically loadable connectors adapted to communicate with the non-SQL document store via its data access interface. Supported connectors may include a first connector that treats data within an individual document in the document store as multiple table rows, and a second connector that treats individual documents as individual table rows. In some embodiments, both types of document access modes may be implemented by a single multi-modal connector. In some embodiments, the connector may enable a single SQL table to be stored using a set of multiple documents. The connector may also provide the document identifier of the documents as an attribute of the table. Advantageously, by allowing multiple table rows to be stored in an individual document, a table can be stored using less storage space and accessed using less computing resources (e.g. less network bandwidth and processing power). In some embodiments, the disclosed SQL database system may be used for streaming applications where data reads and writes must be performed quickly.

Figure 1:
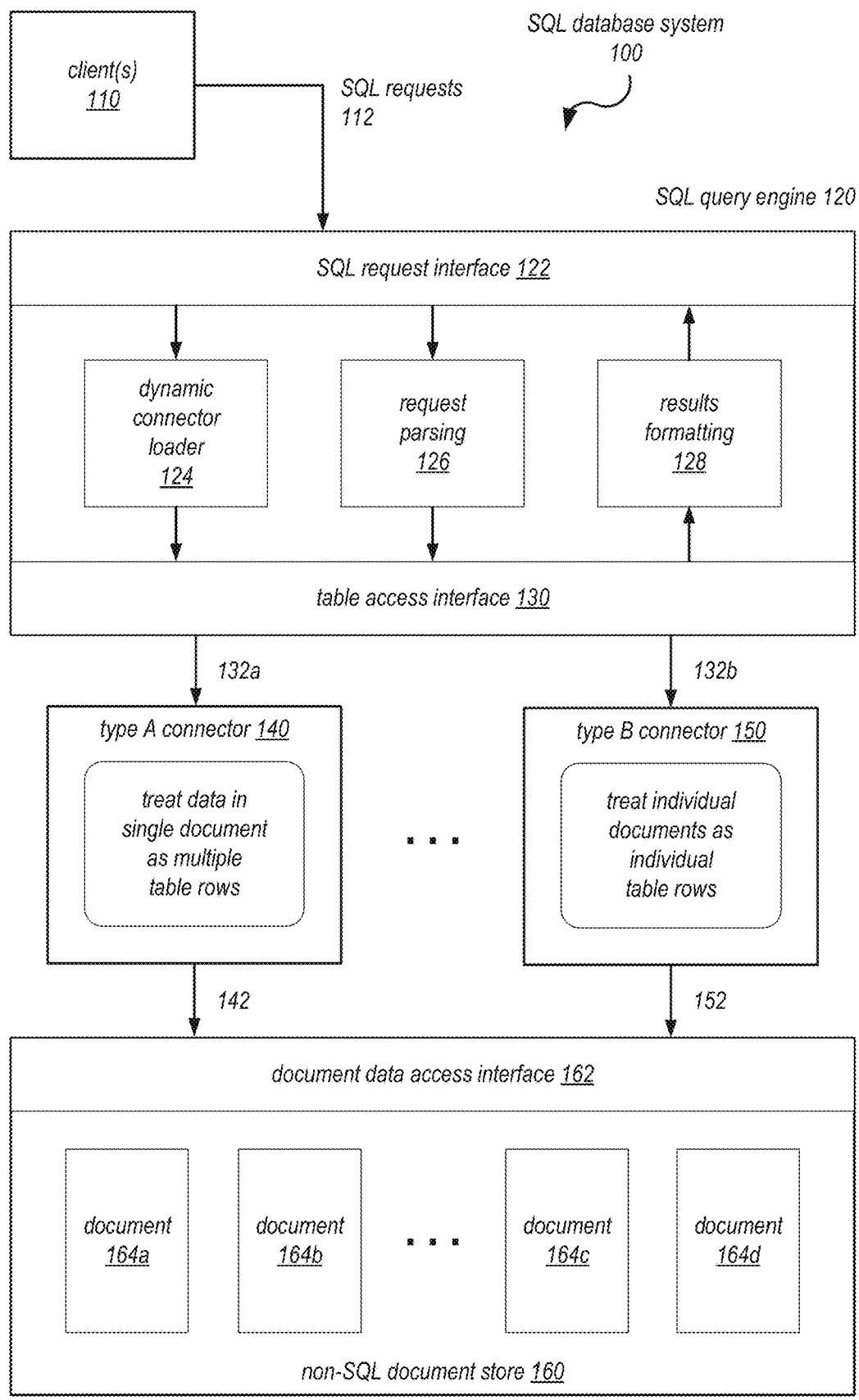
FIG. 1 is a block diagram illustrating components of a SQL database system that performs SQL queries on a non-SQL document store and treats data in a single document as multiple table rows, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

When a non-SQL document store is used to store table data to be accessed by a distributed SQL query engine such PRESTO or TRINO, individual table rows are typically stored as individual documents. While this is a straightforward and workable way to store table data for some types of applications, this storage model has a number of disadvantages. For example, when reading a large table, the SQL query engine may need to download many documents for a single query, which increases system resource usage and query response time. As another example, a single update statement may require the numerous API calls to the document store (both to fetch the existing data and write the new data), causing the update statement to perform badly. In some cases, if a SQL request exceeds a document-based usage limit of the document store (e.g. a maximum number of documents that can be fetched or updated), the request may fail altogether.

To address these problems of current SQL database systems implemented on top of non-SQL document stores, this disclosure describes embodiments of a SQL database system that stores table data in the non-SQL document store using alternative storage models. In some embodiments, the SQL database system may include a distributed SQL query engine configured to use different types of dynamically loadable connectors adapted to communicate with the non-SQL document store via its document data access interface. Supported connectors may include a first connector that treats data within an individual document in the document store as multiple table rows, and a second connector that treats individual documents as individual table rows. In some embodiments, both types of document access modes may be implemented within a single multi-modal connector. In some embodiments, the connector may enable a single SQL table to be stored across multiple documents, where each document stores a set of rows linked to a particular key value or key value range. In some embodiments, the key value(s) associated with the set of rows may be stored as a document identifier of the documents and provided by the connector as an attribute of the table.

Advantageously, the disclosed SQL database system allows table data in the non-SQL document store to be stored and accessed more efficiently. By allowing multiple table rows to be stored in one document, a table can be stored using less storage space and accessed using less computing resources (e.g. less network bandwidth and processing power). In some embodiments, the disclosed SQL database system may be used for streaming applications where data writes must be performed quickly (e.g. as soon as new data is received). For table reads, the disclosed SQL database system is able to fetch more table rows per call to the document store, resulting in better query performance and less resource usage. In some embodiments, the disclosed manner of storing table data may be used to avoid one or more document-based usage limit(s) of the non-SQL document store. These and other advantages and features of the SQL database system are discussed in further detail below, in connection with the figures.

FIG. 1 is a block diagram illustrating components of a SQL database system that performs SQL queries on a non-SQL document store and treats data in a single document as multiple table rows, according to some embodiments.

The figure depicts a SQL database system 100 that is configured to handle SQL requests 112 from various clients 110. In some embodiments, the clients 110 may be remote from SQL database system 100, and the SQL requests may be received over the network (e.g. as HTTP requests). The SQL requests 112 are specified in the structured query language (SQL), and may include SQL statements to read or write table data in the SQL database system 100. In some embodiments, the client 110 may be a streaming application that produces a continuous stream of data to be written to the SQL database system at a fast rate. Advantageously, the disclosed SQL database system 100 is able to handle a fast rate of data writes by using the efficient data storage model in the non-SQL document data store, as will be described in detail below.

As shown, the SQL requests 112 are first received by a SQL query engine 120. The SQL query engine may implement SQL request interface 122 to receive the SQL requests 112. The SQL request interface 112 may be a user interactive interface such as a command line interface or a graphical user interface (GUI). Alternatively, the SQL request interface 112 may be a programmatic interface such as a service interface or application programming interface (API).

As shown in this example, the SQL query engine 120 implements a number of components 124, 126, and 128. In some embodiments, the dynamic connector loader component 124 is configured to load different types of connector modules (e.g. connectors 140 and 150) that are adapted to communicate with different types of data stores used by the SQL database system (e.g. non-SQL document store 160). The different connectors are configured to interact with different types of data stores and present a table access interface 130 to the SQL querying engine 120 that allows the engine to read and write table data from and to the different data stores. A connector may be implemented as a dynamically loadable module that can be loaded into the memory space of the SQL query engine 120 at runtime.

As shown, the SQL query engine 120 may perform certain high-level tasks as part of SQL request handling. For example, a request parsing component 126 may be used to parse incoming SQL statements into syntactical elements used by the query engine. In some embodiments, the SQL query engine may devise an execution plan to carry out the SQL request, specifying how table data will be fetched from the underlying data store. A results formatting component 128 may be implemented in some embodiments, which may be tasked with transforming returned table data into a form expected by the client 110. For example, the results formatting component 128 may be used to perform certain aggregation functions specified by the SQL request or sort the returned data in an order specified by the SQL request. In some embodiments, some of the functionalities of components 126 and 128 may be pushed down to lower levels of the SQL database system, for example, to the connectors 140 or 150, or even to the non-SQL document store itself.

As shown, the connectors 140 and 150 may provide the table access interface 130 to the SQL query engine 120. For example, such an interface 130 may be provided as an API to fetch and update table row data in the SQL database system. When a table access is requested 132 by the SQL query engine 120, the connectors 140 and 150 will translate the request into one or more calls 142 and 152 directed to the document data access interface 162 of the non-SQL document store 160. For example, the connectors 140 and 150 may issue one or more calls to the document store to retrieve certain documents or document data based on search criteria. In some embodiments, the SQL query engine may be a distributed SQL query engine, where the connectors are capable of accessing non-SQL document store(s) 160 located in remote network(s).

The non-SQL document store 160 is configured to store data as individual documents 164a-d. The document data access interface 162 may provide clients of the document store the ability to create and delete documents 164 and read and write data in the documents 164. In some embodiments, the document data access interface 162 may allow clients to search for documents or data in the documents using specified search criteria. However, the non-SQL document store 160 may not natively support a SQL access interface that allows clients to access the documents using SQL statements. Examples of non-SQL document stores include document storage systems such as ELASTICSEARCH and MONGODB, among others. In some embodiments, the non-SQL document store 160 may be provided by a platform-as-a-service provider such as AWS or AZURE, which will operate the computing resources needed to operate the document store as a service. Such a service may be provided to many clients over the Internet, who may use the service store to store their documents 164.

As shown, the SQL query engine 120 in this example is configured to use multiple types of connectors to access the non-SQL document store 160, including a type A connector 140 and a type B connector 150. Type A connector 140 is configured to treat data in a single document in the document store as a set of multiple table rows. Thus, connector 140 is configured to return potentially multiple table rows from each individual document 164. On the other hand, type B connector 150 is configured to treat each individual document as an individual table row. Thus, a table of n rows will be stored as n separate documents.

In some embodiments, the type A connector 140 will cause the document store 160 store table rows in a document as an object array. For example, a single document 164a in the document store (e.g. a JSON document) may include an object array of nested objects, where each top-level object in the array represents a table row. In some embodiments, the set of rows in a document may be stored in a compressed or binary format, so that a set of rows in a document are fetched and written collectively as a unit. In some embodiments, a table in the SQL database system may be partitioned into multiple documents. The document or partition boundaries may be created when the table is created or updated as the table grows. In some embodiments, each document may be associated with a key value or key value range in the table, so that all objects in a document contain the key value(s) that fall within the key value range of the document. In this way, a query that specifies the key as the search criteria can be performed by examining only those documents that contain the satisfying key value(s), while skipping the documents that do not. In some embodiments, the key value associated with a document may be stored within the document, for example, as a document ID. In some embodiments, the connector 140 is configured to retrieve this document ID and presented as an attribute of returned table rows.

It noted that although the SQL query engine 120 is configured to use both types of connectors 140 and 150, in practice only one type of connector may be deployed with the SQL query engine 120 to implement the SQL database system 100. In other embodiments, both types of connectors 140 and 150 may be deployed with the SQL query engine, so that the non-SQL document store can be accessed in different ways, depending on the connector. In some embodiments, connectors 140 and 150 may be implemented as a single connector module that supports two modes of accessing the document store.

As may be appreciated by those skilled in the art, type A connector 140 provides advantages over type B connector 150 in certain types of applications. For example, type A connector allows tables to be stored in the document store 160 using fewer documents and less storage space. With connector 140, table reads and writes can be performed more quickly and using less resources in the document store, since fewer documents will need to be opened. In some embodiments, the amount of data that must be downloaded and uploaded from and to the document store may also be reduced, so that less network bandwidth is used when reading and writing the table. In some embodiments, type A connector 140 allows the non-SQL document store to be written extremely quickly to support streaming applications. For example, multiple table rows may be updated at once by overwriting an object array or binary object in a document.

In some embodiments, the connector may further optimize write performance by caching updated table data and flushing the data to the document store asynchronously (e.g. after a set period of time or a number of row updates).

Additionally, in some embodiments, type A connector 140 may provide a way of avoiding certain document-based usage restrictions imposed by the non-SQL document store 160. For example, the document store may impose limitations such as the number of documents that can be stored per customer, the number of documents that can be retrieved via a single call, the number of documents that can be updated during a set time interval, etc. In some embodiments, increased usage of the document store according to these metrics may result in additional costs to the customer. Advantageously, by using the alternative storage model to store multiple table rows per document, these document-based usage restrictions may be largely avoided, in some cases providing substantial cost savings to the customer.

Figure 2:
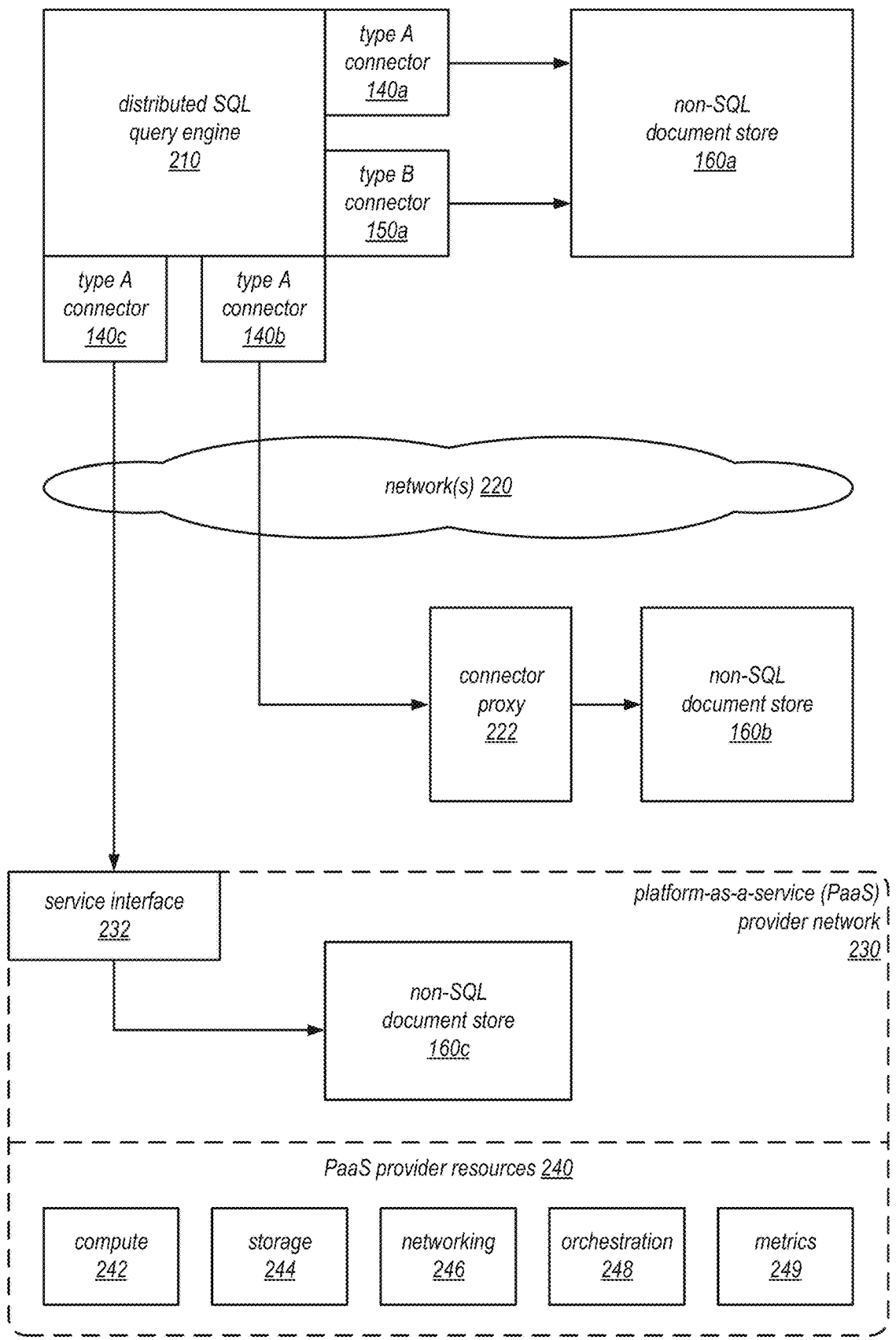
FIG. 2 illustrates a SQL query engine configured to perform SQL queries on different types of non-SQL document stores using different types of connectors, according to some embodiments.

FIG. 2 illustrates a SQL query engine configured to perform SQL queries on different types of non-SQL document stores using different types of connectors, according to some embodiments.

As shown, the figure depicts a distributed SQL query engine 210 that is capable of using multiple types of non-SQL document stores 160a-c as the underlying data store for table data. The distributed SQL querying engine 210 is an embodiment of the SQL query engine 120 of FIG. 1. As shown, the distributed SQL query engine 210 is configured to use different connectors (e.g. connectors 140a-c and 150a) to connect to different types of data stores to issue queries or updates to the different types of data stores. In some embodiments, the query engine may be able to connect to two different types of data stores at the same time and read two tables in the two data stores in a single SQL query (e.g. as part of a join).

As shown, non-SQL document store 160a is local to the distributed SQL query engine 210. For example, document store 160a may be located in the same local area network as the SQL query engine 210, or even on the same server as the SQL query engine. In this example, the SQL query engine 210 uses both type A and type B connectors to access document store 160a. Accordingly, the SQL query engine may use document store 160a to store tables under both storage modes.

As shown, the distributed SQL query engine 210 uses a type A connector 140b to connect to non-SQL document store 160b over one or more networks 220. In various embodiments, the network(s) 220 may encompass any suitable combination of networking hardware and protocols necessary to enable communications between the SQL query engine 210 and non-SQL document store 160b. In some embodiments, the SQL query engine 210 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the private network of the SQL query engine 210 and the non-SQL document store 160b. In some embodiments, table data returned from the non-SQL document store 160*b* are transmitted over the network 220 using secure communication channels such as transport layer security (TLS) connections between the connector and the non-SQL document store.

As shown in this example, connector 140*b* does not connect to the non-SQL document store 160*b* directly, but rather through a connector proxy 222 executing on the remote network. In some embodiments, the connector proxy 222 may be considered part of the connector 140*b*. Connector 140*b* may communicate with the connector proxy 222 using a proprietary protocol to instruct the proxy to make API calls to the document store 160*b*. Depending on the embodiment, the proxy 222 may be used to perform a variety of tasks such as compressing and decompressing data to and from the document store, caching data recently read or written to improve data access performance, and storing metadata to control the fetching or retrieval of data, among types of activities.

As shown, the distributed SQL query engine 210 uses another type A connector 140*c* to communicate with non-SQL document store 160*c* hosted in a platform-as-a-service (PaaS) provider network 230. The PaaS provider network may host computing resources to implement the non-SQL document store 160*c* as a service and a service interface 232 to receive document access requests from many connectors such as connector 140*c*. The PaaS provider network 230 may provide different types of computing resources 240, which can be leased by customers to implement custom hosted applications or services. As shown in this example, the PaaS provider provides resources such as compute resources 242, storage resources 244, networking resources 246, orchestration resources 248, and resource metrics monitoring 249. The components of the non-SQL document store 160*c* may be built using these underlying resources provided by the PaaS provider. In some embodiments, the PaaS resources 240 may implement features such as load balancing of incoming service requests and/or dynamic management and scaling of service node pools. In some embodiments, the PaaS provider may be a provider such as AMAZON WEB SERVICES or MICROSOFT AZURE, and the non-SQL document store 160*c* may be a data storage service such as ELASTIC SEARCH or MONGODB.

Figure 3:
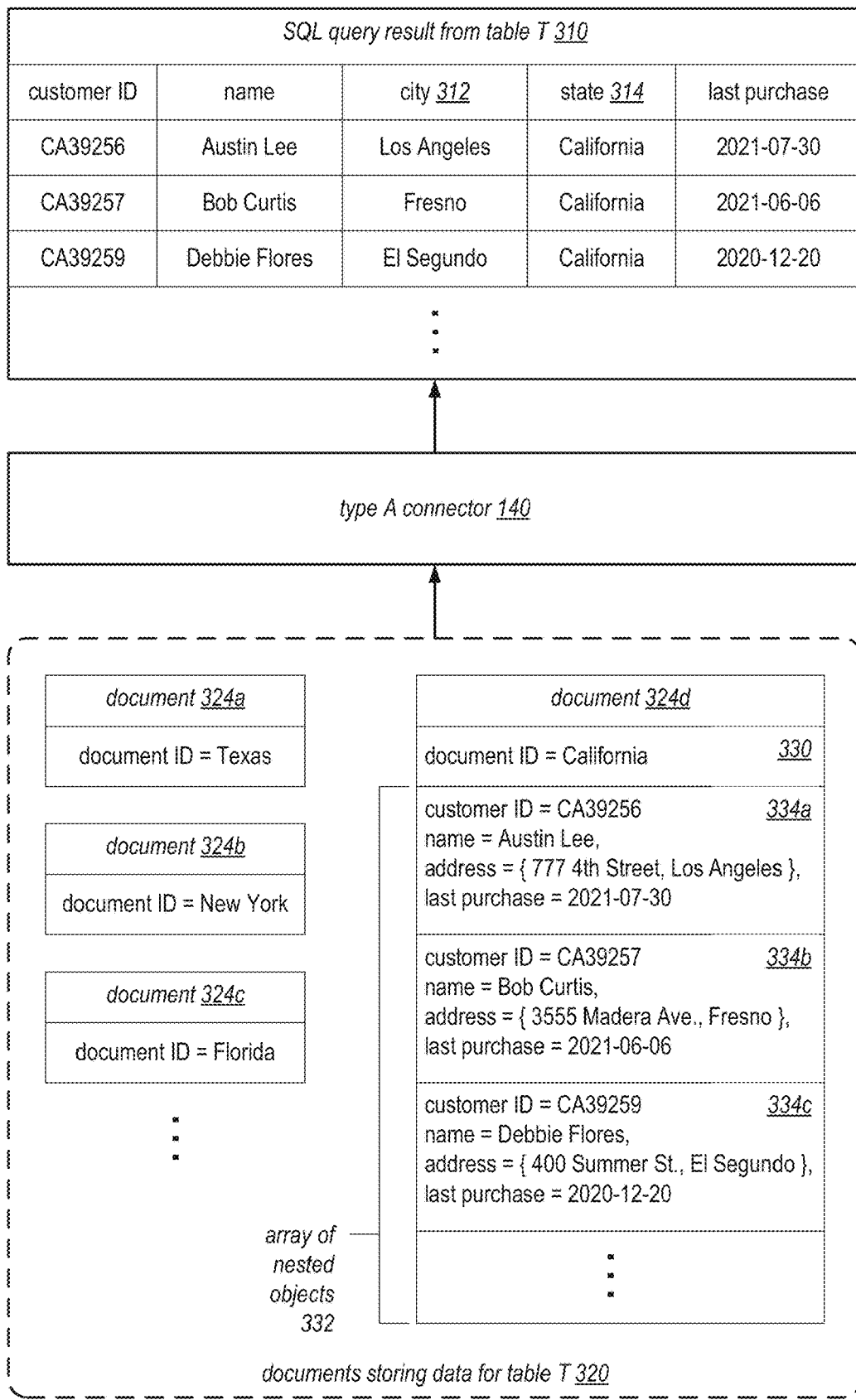
FIG. 3 illustrates a type of connector configured to fetch data from a non-SQL document store that treats data in a single document as multiple table rows, according to some embodiments.

FIG. 3 illustrates a type of connector configured to fetch data from a non-SQL document store that treats data in a single document as multiple table rows, according to some embodiments.

As shown, the document store in this example stores a set of documents 320 that contains data for a SQL table T. Example table T stores data for customers, including a customer ID, the customer name, customer address, customer state, and a last purchase date, as shown for the document 324*d*. In some embodiments, the documents 324*a-d* may be stored as JSON documents by the document store. When a SQL query is received by the SQL database system, connector 140 will be instructed to fetch row data from the table T, which is stored as the documents 324*a-d*.

As shown in this example, the documents 324*a-d* have a document identifier 330 that indicates the state attribute of the table. This attribute is used as a key to partition the table data among the documents. As shown, the document ID is fetched by the connector 140 and provided as part of the returned table data in a SQL query result 310 (as state attribute 314). The way that a table is partitioned into multiple documents may be configurable by the client. For example, in some embodiments, the connector 140 may expose one or more configuration parameters that allow users to specify the partition key(s) to use to divide table data among the documents. In some embodiments, the SQL database system may allow a client to specify the partition key(s) as part of the table metadata or as a document store-specific directive when creating the table. In some embodiments, the connector may automatically select one or more keys, such as the table's primary key set, to use as the partition key(s). In some embodiments, the connector may choose to use a generated key as the partition key, which may be occasionally updated to rebalance the documents.

As shown, the documents 324*a-d* store rows of the table as an array 332 of nested objects. As shown in document 324*d*, each table row is stored as an object 334*a-c* in the array. The objects 334*a-c* are nested objects because they include an "address" sub-object, which is indicated in braces. As shown, the connector 140 is configured to parse these nested objects and return an attribute in the sub-object as a table attribute or query result attribute (e.g. city attribute 312).

In some embodiments, in order to fetch table data from the documents, the connector 140 will issue one or more calls to the document store to cause the document store to open the appropriate document(s) and return objects in the object array 332. In some embodiments, the document store may implement its own searching capabilities, such as document indexes, and the connector 140 may "push down" query criteria specified by the query to the document store, so that the document store can use its own searching capabilities to find matching data more efficiently. In some embodiments, the document store may implement the ability to search the object array 332 so that only a subset of objects in the array is returned.

In some embodiments, the connector 140 may also permit the SQL database system to update the table data in the documents 324. To update the table data, the connector 140 will issue one or more calls to the document store to cause the document store to open the appropriate documents and update the object array. In some embodiments, a change to any object in the object array will cause the entire array to be overwritten. In some embodiments, the document store may permit updates to individual objects in the array. In some embodiments, the manner in which document data is updated is configurable via the connector 140.

Figure 4:
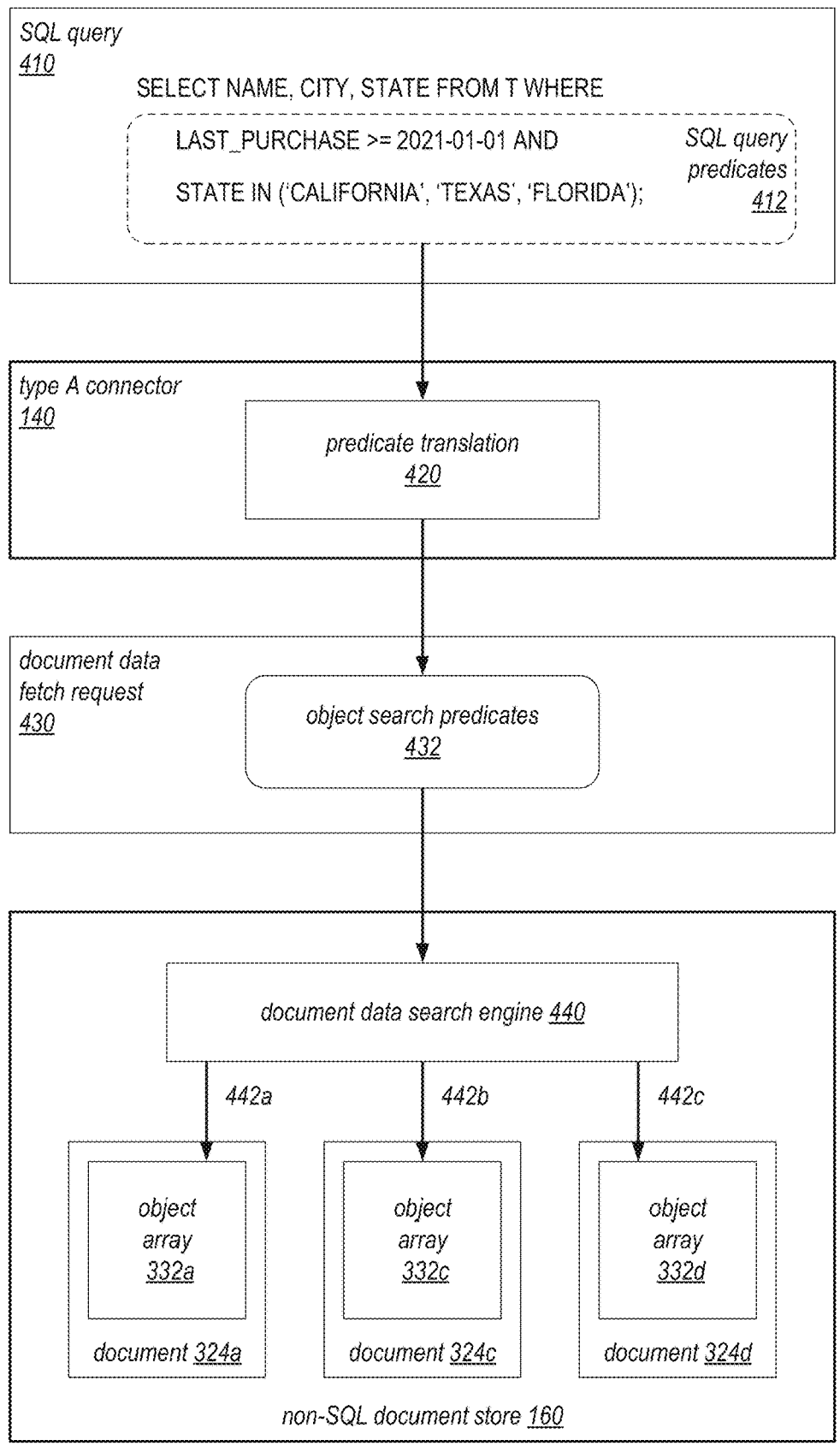
FIG. 4 illustrates a type of connector that translates SQL predicates into object search predicates usable by the non-SQL document store, according to some embodiments.

FIG. 4 illustrates a type of connector that translates SQL predicates into object search predicates usable by the non-SQL document store, according to some embodiments.

In this example, a SQL query 410 received by the SQL database system specifies a set of SQL query predicates 412 to fetch data from table T. Such SQL query predicates may also be specified for SQL write requests, including update and delete statements.

As shown in this example, the SQL query predicates 412 are provided to a predicate translation component 420 of the type A connector 140, which will translate the SQL query predicates to a set of object search predicates 432. The object search predicates 432 may be specified as parameters to the document data fetch request 430 submitted to the non-SQL document store 160. In some embodiments, the predicate translation functionality 420 may be performed partly at the SQL query engine 120, before fetch instructions are provided to the connector 140.

As shown, the object search predicates 432 are used by a document data search engine 440 implemented by the document store 160 to perform a search of the table data. Depending on the embodiment, the document store 160 may be able to search 442*a-c* for individual documents 324 meeting the search criteria, or even for individual objects within the respective object arrays 332 of the documents.

For example, to search for table rows in table T for the SQL query 410, the document data search engine 440 may first open a subset of the documents 324 matching the "state" attribute (i.e. "California", "Texas", and "Florida" documents), and then search for individual objects in the object arrays 332 of those documents for objects satisfying the "Last Purchase" criterion.

Figure 5A:
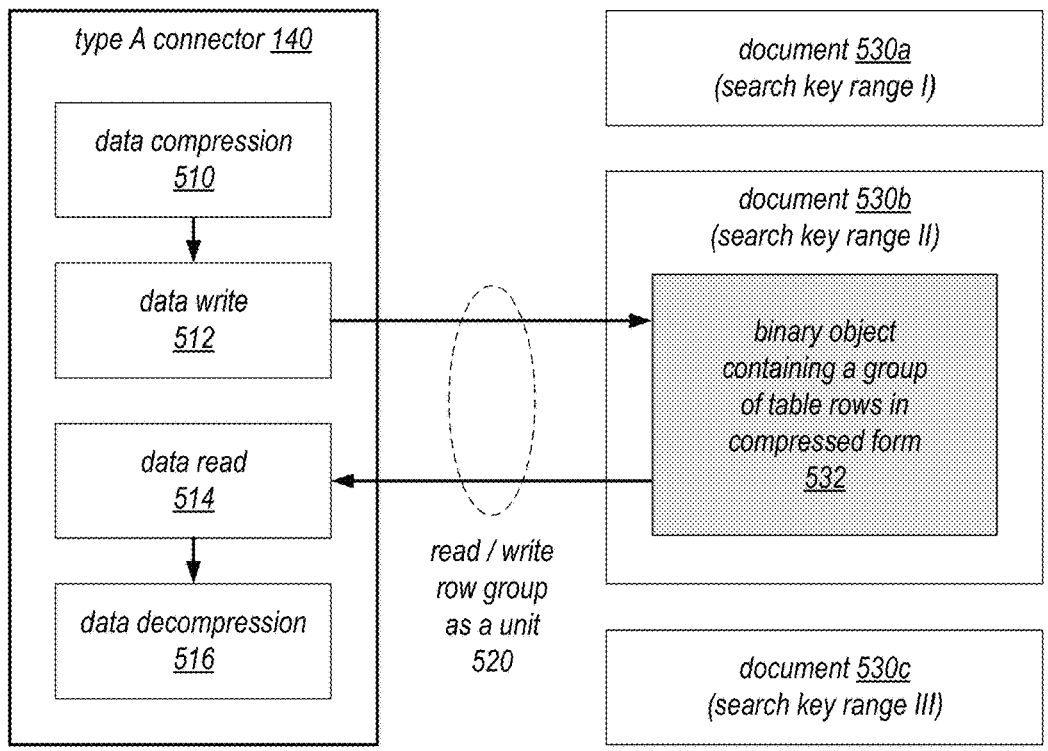
FIGS. 5A and 5B illustrate different connectors that compress and decompress table data stored in the non-SQL document store, according to some embodiments.
Figure 5B:
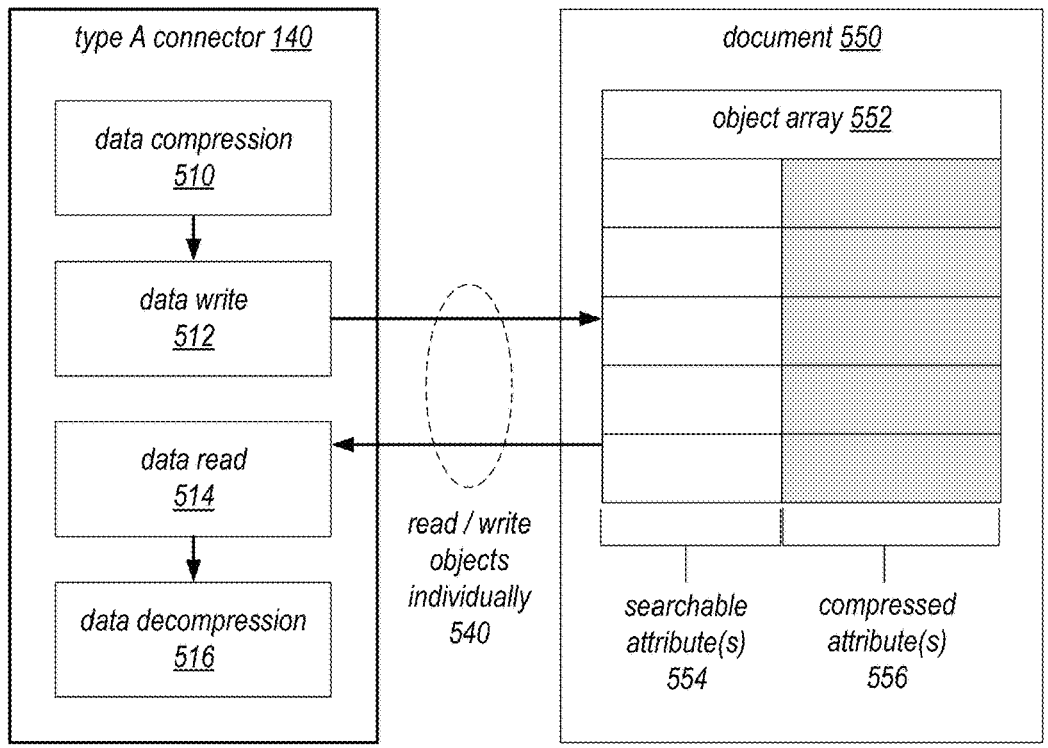

FIGS. 5A and 5B illustrate different connectors that compress and decompress table data stored in the non-SQL document store, according to some embodiments.

Another type of functionality that may be implemented by the connector is the compression and decompression of data sent to and received from the non-SQL document store. This functionality may be performed transparently by the connector in order to further reduce the amount of network traffic sent over the network and the amount of data stored in the document store. In some embodiments, the compression/decompression may be performed in conjunction with a data encryption/decryption scheme implemented by the connector.

In the embodiment shown in FIG. 5A, the type A connector 140 implements a data compression component 510, which compresses table data before it is transmitted over the network by the data writer 512. In this example, the table data is stored in a set of documents 530*a*-*c*, which correspond to different search key ranges of the table. As shown, the table data in each document 530 is stored as a binary object 532, which contains the group of table rows stored in a compressed form. In some embodiments, when the row data is stored in this compressed form, the individual rows are no longer searchable by the document store. However, the data can still be searched on a per-document level using the search key(s) that partition the documents. When the table is written by the data writer 412, the entire binary object 532 may be written 520 as a unit. This approach reduces the number of calls that must be issued to the document store and can dramatically increase the speed of table writes.

When the table is read by the data reader 514, the entire binary object 532 may be fetched over the network as a unit. Once received, the connector 140 will decompress the binary object using a data decompression component 516, and then possibly perform additional filtering to return the queried-for rows to the SQL query engine. In some embodiments where the connector 140 is the only user of the table, the state of the decompressed data may be cached by the connector 140, so that the binary object 532 is only rewritten occasionally.

In the embodiment shown in FIG. 5B, the type A connector 140 uses a different compression approach. In this approach, the table rows are maintained as individual objects in the object array 552 in a document 550 in the document store. However, certain attributes 556 of the rows are stored in a compressed form, while other searchable attributes 554 of the rows are stored in uncompressed form. When table data is read or written, the table rows (objects in the array) can be read or written individually 540. In some embodiments, each entry in the object array 552 may represent a block of table rows having the same search key value, so that these row "blocks" are read and written as a unit. While this storage approach requires more storage at the document store, it allows the table rows to be individually searchable within each document 550. Some benefits of data compression are still realized with the compression of some attributes of the table.

In some embodiments, how the data is compressed in the documents is controlled via client configuration (e.g. as a configuration parameter of the connector 140). In some embodiments, this aspect of data storage may be varied on a per-table basis. For example, each table may be associated with metadata (possibly also stored in the document store) that specify how data should be compressed for the table. In some embodiments, the compression scheme may be automatically determined when a table is created. In some embodiments, the connector 140 may expose a table management API that allows the table compression scheme to be altered during the life of the table. When the compression scheme for a table is changed, the connector may initiate a process in the document store to convert all documents associated with the table from one compression scheme to another.

Figure 6:
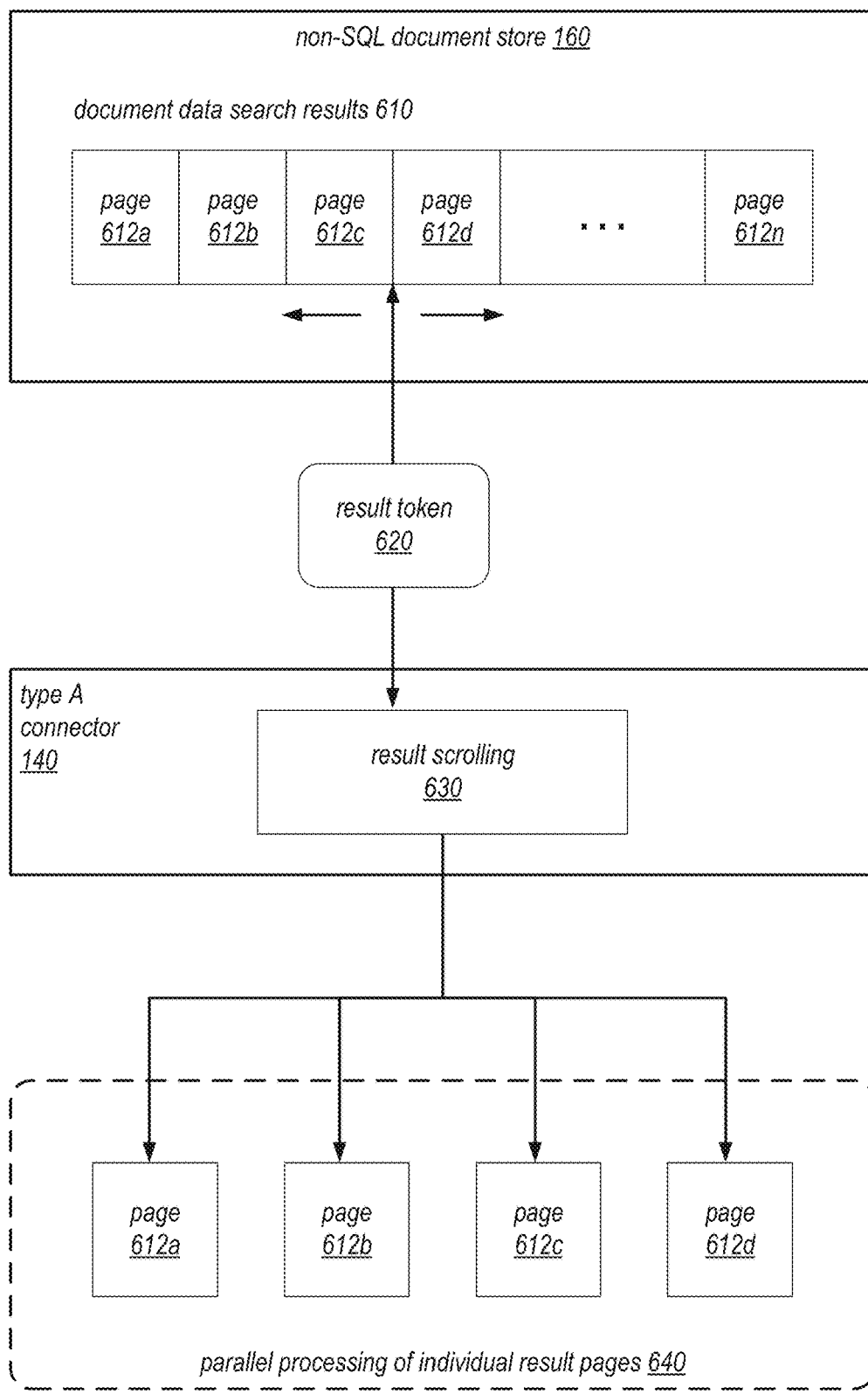
FIG. 6 illustrates a connector that uses a result token provided by the non-SQL document store to scroll through pages of returned results, according to some embodiments.

FIG. 6 illustrates a connector that uses a result token provided by the non-SQL document store to scroll through pages of returned results, according to some embodiments.

In some embodiments, the non-SQL document store 160 may be able to return document data search results 610 in individual slices or pages 612*a*-*n*. Individual records in the result slices or pages 612 may represent individual documents, objects, or compressed blocks of data, as discussed previously. When the results 610 are returned as pages, the document store 610 may provide a result token 620 that allows the client (here connector 140) to easily navigate through the pages. In some embodiments, the result token 620 represents a pointer, position, cursor, or address in the result space 610, which may be temporarily saved by the document store. The token may be used by clients to retrieve the results one page at a time, for example, by repeatedly requesting successive pages of the result space. In some embodiments, a result token may also be used to update objects in the document store.

As shown, embodiments of the connector 140 may implement a result scrolling component 630 to take advantage of the pagination of results provided by the document store. In some embodiments, the connector 140 will use the result scrolling component 630 to retrieve one page of results at a time, so that the results can be processed at a desired pace (e.g. as permitted by the memory limits of the SQL query engine). In some embodiments, connector 140 may retrieve multiple pages at a time, as shown, and process 640 the individual pages in parallel. When processing on one page is finished, the connector will fetch another page of results by advancing the result token 620. In some embodiments, if processing of a particular page fails unexpectedly, the result scrolling component 630 may be used to fetch that page again for reprocessing.

In some embodiments, result scrolling may be used to take advantage of parallelization capabilities provided by the SQL query engine. For example, embodiments of the SQL query engine may be able to process table row results in parallel using a group of threads, processes, or machine/container instances. The connector 140 may be used to fetch result pages individually to support such parallel processing 640. In some embodiments, the connector 140 itself may be configured to perform parallel processing based on the individual result pages 612.

Figure 7A:
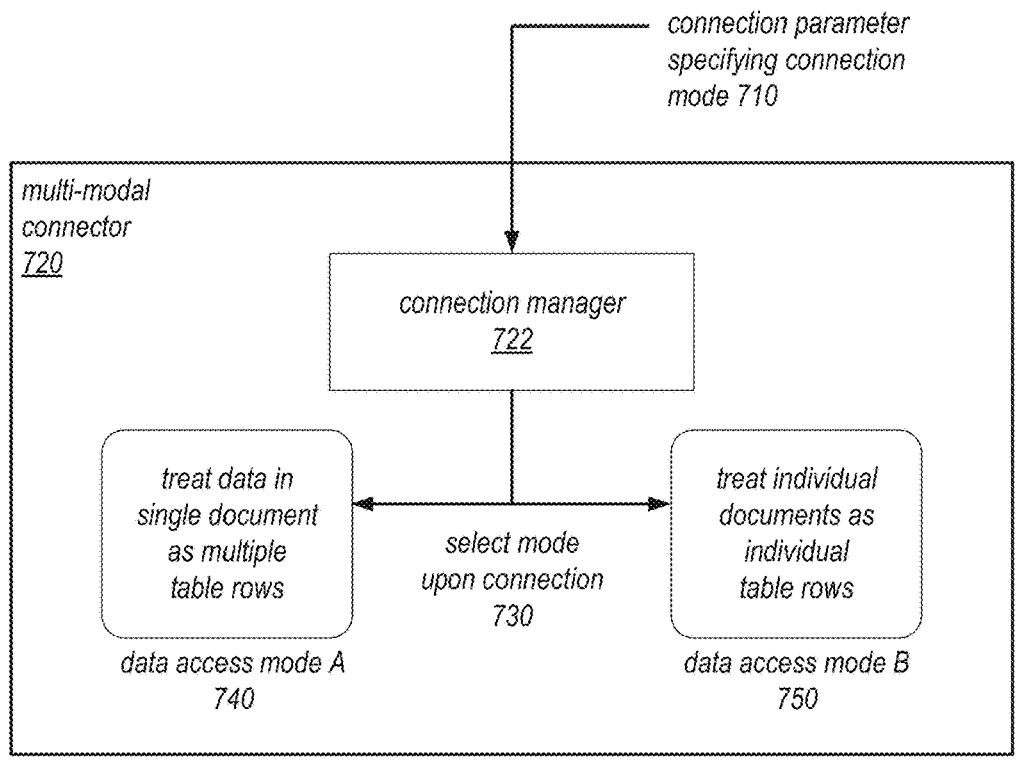
FIGS. 7A and 7B illustrate examples of multi-modal connectors that implement different modes of reading and writing document data from and to the non-SQL document store, according to some embodiments.
Figure 7B:
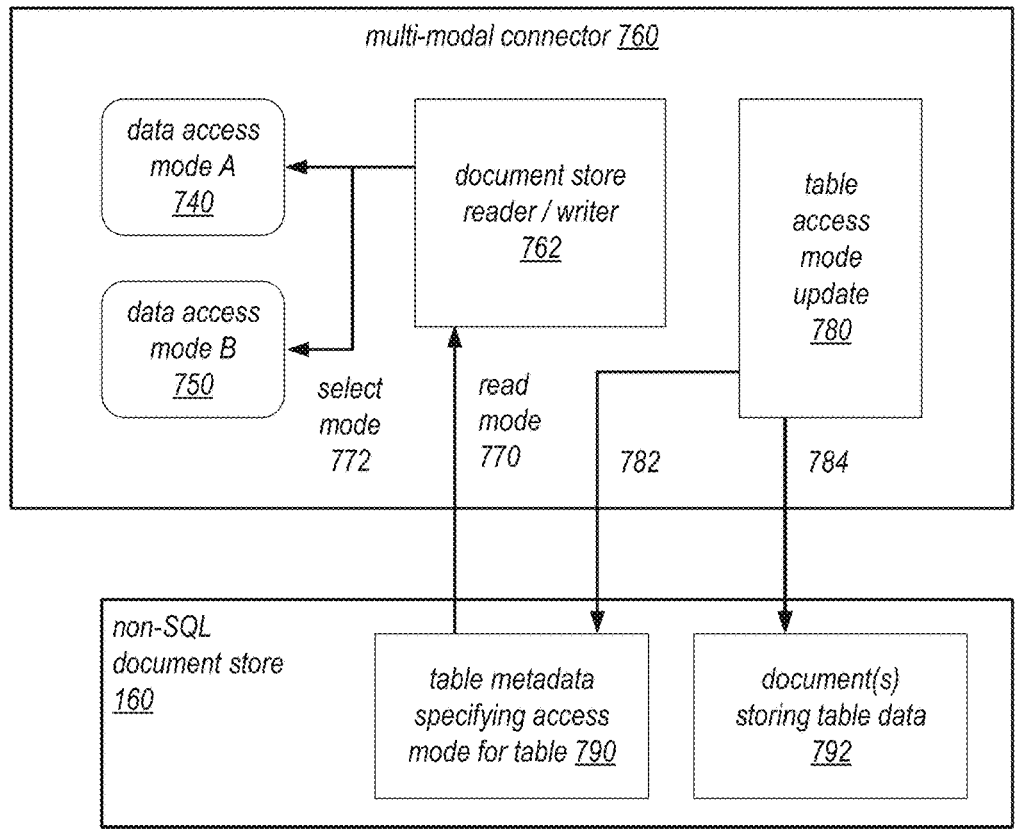

FIGS. 7A and 7B illustrate examples of multi-modal connectors that implement different modes of reading and writing document data from and to the non-SQL document store, according to some embodiments.

In some embodiments, the connector of the SQL database system 100 may be programmed to access the non-SQL document store 160 using different access modes, including the two access modes implemented by the type A connector 140 and the type B connector 150 of FIG. 1. Thus, depending on the access mode, the multi-modal connector can treat a document in the document store as either a single table row (type B connector) or a set of multiple table rows (type A connector).

As shown, multi-modal connector 720 allows clients to select the access mode upon connection, using a connection parameter 710 that specifies the access mode for the connection. In some embodiments, the multi-modal connector 720 implements a connection manager 722 that is configured to establish a connection to the non-SQL document store. Depending on the embodiment, the connection may be a low-level TCP/IP connection or an application-level connection supported by the document store. In some embodiments, the connection may require authentication of a client credential, and the connection itself may be secured using an encryption protocol such as TLS. In some embodiments, one of the parameters for the connection may be used to specify an access mode that selects 730 how documents in the document store are treated during the connection. As shown, depending on the connection parameter, the multi-modal connector 720 may treat the documents under data access mode A 740, which treats data in a single document as multiple table rows, or data access mode B, which treats each individual document as an individual table row. In some embodiments, the access mode selected at connection time may be changed during the connection based on user input or API call.

As shown, multi-modal connector 760 implements another access mode selection mechanism, where the two data access modes 740 and 750 are selected 772 based on table metadata 790 stored in the non-SQL document store 160. In this example, when a table is accessed via the multi-modal connector 760, the connector determines the access mode of the table by reading 770 the table metadata 790 from the document store. In some embodiments, this metadata 790 may be stored elsewhere, such as a local repository of the connector 760. In some embodiments, the table metadata 790 may be read and cached by the multi-modal connector 760 before the table is actually accessed, for example, when the connector first makes a connection to the document store.

As shown, the multi-modal connector 760 may also implement a table access mode updater module 780, which may allow a client to change the access mode of the table via a configuration interface. In some embodiments, the table access mode 740 and 750 may first be set for a table when the table is created (e.g. using a directive in the SQL create table statement). Thereafter, the table access mode may be changed (e.g. using a directive in a SQL alter table statement). When the access mode of the table is changed, the updater component 780 will update both the table metadata 790 and the underlying documents 792 to change how the data is stored for the table. In some embodiments, the update 784 to the documents 792 may be performed as a long-running process to gradually convert the table data. The process may copy the table data from one set of documents in a first storage mode to a second set of documents in a second storage mode. During the process, the table data can still be accessed under the old access mode. Once the conversion process is completed, the updater component 780 will update 782 the table metadata 790 to atomically switch the table over to the newer set of documents.

Figure 8:
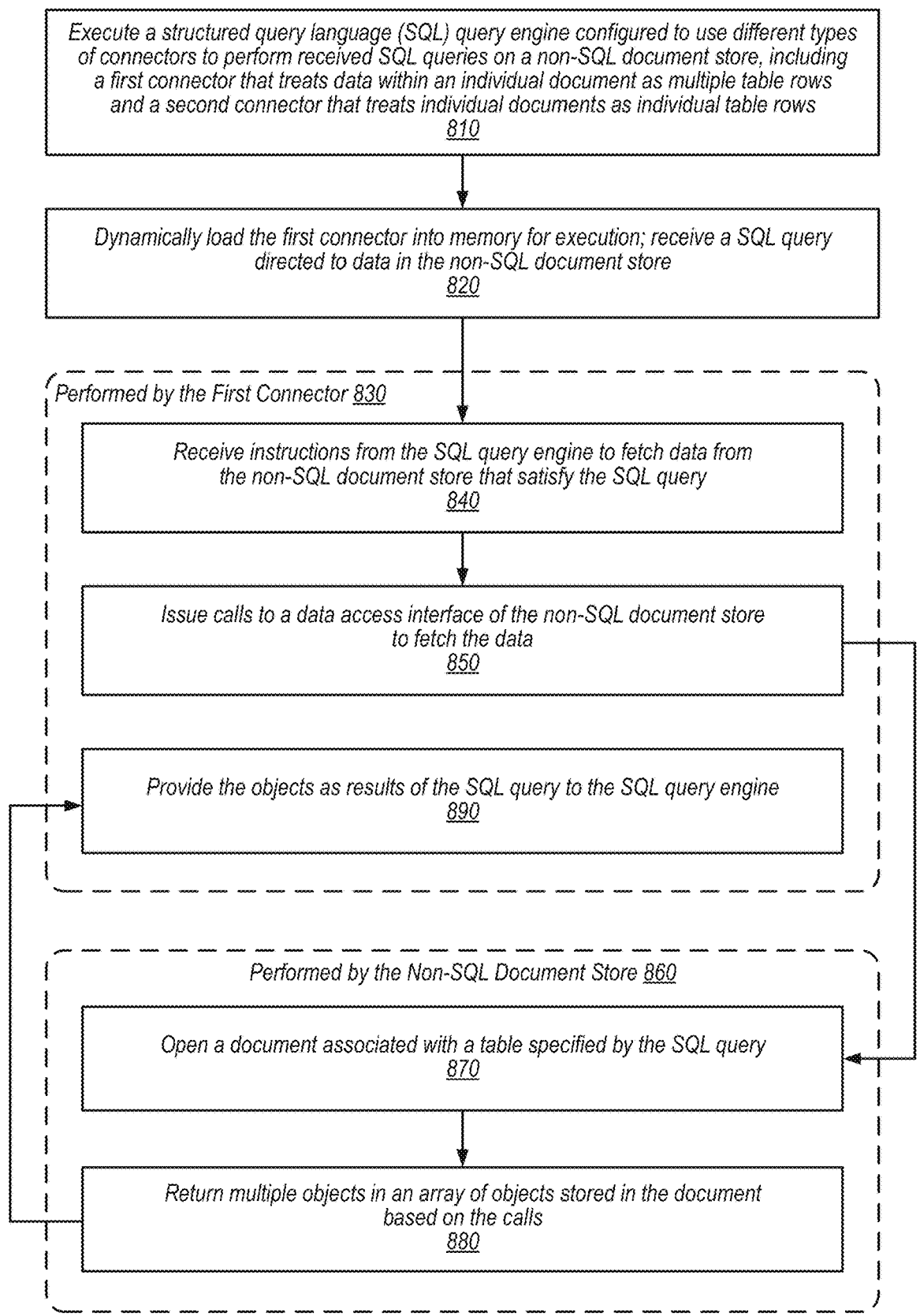
FIG. 8 is a flowchart illustrating a process of SQL database system obtaining query results for a SQL query from a non-SQL document store using a connector, according to some embodiments.

FIG. 8 is a flowchart illustrating a process of SQL database system obtaining query results for a SQL query from a non-SQL document store using a connector, according to some embodiments. The depicted process may be performed by an embodiment of the SQL database system 100 of FIG. 1.

The process begins at operation 810, where a structured query language (SQL) query engine is executed. The SQL query engine may be SQL query engine 120 of FIG. 1. The SQL query engine may be configured to use different types of connectors that are adapted to communicate with a non-SQL document store to perform SQL queries on the document store. Examples of the non-SQL document store may include ELAST SEARCH and MONGODB. In some embodiment, the SQL query engine may support multiple types of connectors that connects to a particular document store, including a first connector (e.g. type A connector 140) that treats data within each document as multiple table rows, and a second connector (e.g. type B connector 150) that treats each individual document as an individual table row. In some embodiments, the two types of connectors may be implemented by a single connector module.

At operation 820, the first connector is dynamically loaded into memory for execution. In some embodiments, the loading may be performed by the dynamic connector loader component 124 of FIG. 1. The loader may load the connector into a same memory space that is used to execute the SQL query engine so that the connector can be used by the SQL query engine to fetch data from the non-SQL document store when a SQL query directed to data in the document store is received.

As shown, operations 840, 850, and 890 are performed 830 by the first connector. At operation 840, the connector receives instructions from the SQL query engine to fetch data from the non-SQL document store satisfying the received SQL query. In some embodiments, the instructions may be received from API provided by the connector, such as the table access interface 130 of FIG. 1.

At operation 850, connector will issue one or more calls to a data access interface of the non-SQL document store to fetch the data of the table. In some embodiments, the one or more calls may be transmitted over a network. In some embodiments, the one or more calls may be sent as web service requests formatted in HTTP.

When the calls are received by the non-SQL document store, the calls cause the document store to perform 860 operations 870 and 880. At operation 870, the document store opens a document associated with a table specified by the SQL query. As discussed, in some embodiments, a table may be associated with multiple documents in the document store (e.g. documents 324*a-d*). The documents may be stored as JSON documents. In some embodiments, each document may include an array of nested objects (e.g. array 332), where individual entries in the array is a nested object (e.g. objects 334*a-c*) representing a row in the table.

At operation 880, multiple objects in the array of objects in the document are returned based on the calls. In some embodiments, the document store may simply return the entire array of objects in response to the one or more calls. In some embodiments, the document store may perform a search within the array to return only a subset of the objects, based on search criteria specified by the connector. The subset of objects may be returned to the connector over a network, for example, in the form of one or more HTTP responses.

When the objects are received at the connector, at operation 890, the connection provides the objects as results of the SQL query back to the SQL query engine. The connector will format the object data into a data format expected by the SQL query engine, for example, as dictated by the table access interface 130. In some embodiments where the object data is received in a compressed form, the connector may be configured to decompress the object data. In some embodiments where the document store provides the results in pages, the connector may implement a result scrolling mechanism to manage the retrieval of the pages. In some embodiments, multiple pages may be provided to the SQL query engine for parallel processing. The end result of the processing will be returned to the client as results of the SQL query.

Figure 9:
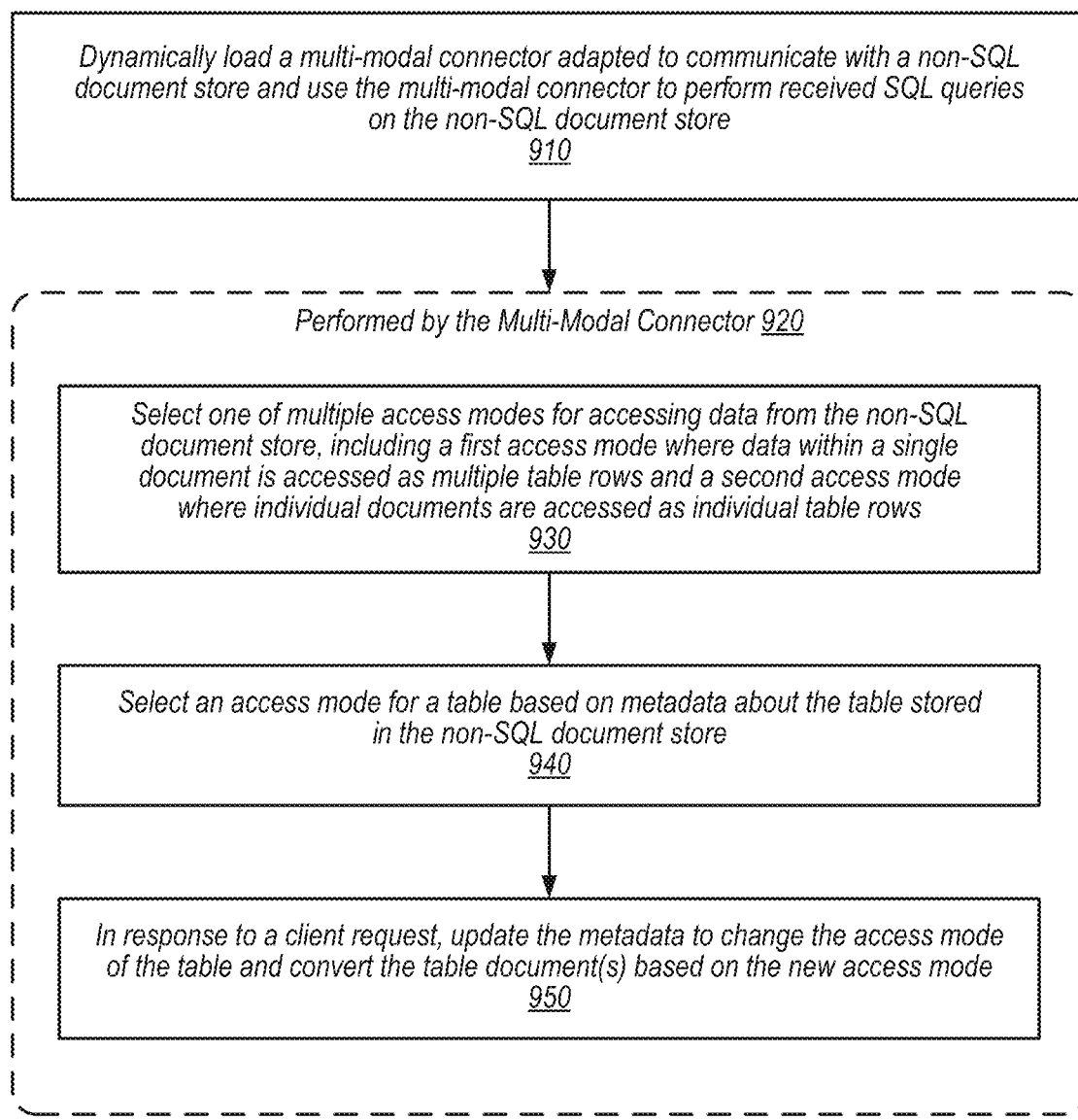
FIG. 9 is a flowchart illustrating a process of a multi-modal connector selecting different modes of operation to read and write data in a non-SQL document store to store SQL table data, according to some embodiments.

FIG. 9 is a flowchart illustrating a process of a multi-modal connector selecting different modes of operation to read and write data in a non-SQL document store to store SQL table data, according to some embodiments. Certain steps shown in the process may be performed by an embodiment of multi-modal connector 720 or 760 of FIGS. 7A and 7B.

At operation 910, the multi-modal connector is dynamically loaded by a SQL query engine (e.g. SQL query engine 120). The dynamic loading may be performed in a similar manner as discussed in connection with operation 820 of FIG. 8. The multi-modal connector is adapted to communicate with a non-SQL document store (e.g. document store 160), in order to perform SQL queries or updates received by SQL query engine. Notably, the multi-modal connector is configured to access the non-SQL document store in at least two data access modes, for example, access modes 740 and 750 of FIG. 7A.

Operations 930, 940, and 950 are performed 920 by the multi-modal connector after it is loaded into memory. At operation 930, the connector selects one of multiple access modes for accessing data from the non-SQL document store. As discussed, the access modes may include access mode 740, where each data within a single document is accessed as multiple table rows, and access mode 750, where each individual document is accessed as an individual table row. In some embodiments, the access mode may be chosen when the connector first establishes a connection to the document store. The desired access mode may be specified by the client in a connection parameter.

At operation 940, the access mode is selected again. This time, the access mode is selected for a particular table based on metadata about the table (e.g. table metadata 790) stored in the non-SQL document store. In some embodiments, such metadata for individual tables can be used to override the default access mode used for a connection. In some embodiments, the table metadata may be read when the table is accessed by the connector. In some embodiments, the table metadata may be read upon connection to the document store, and the access mode for the table is cached by the connector for additional table accesses.

At operation 950, the table metadata is updated in response to a client request to change the table access mode. The update may be performed by a component such as the table access mode updater 780 of FIG. 7B. In some embodiments, the update will change not only the table metadata, but also the documents used to store the table data, in order to convert the table from one storage model to another. For example, if the document store previously stores each row of the table in a separate document, an access mode change may coalesce the table rows into a smaller set of documents. In some embodiments, the connector may continue to make the table available under the old access mode until the conversion process is complete.

Figure 10:
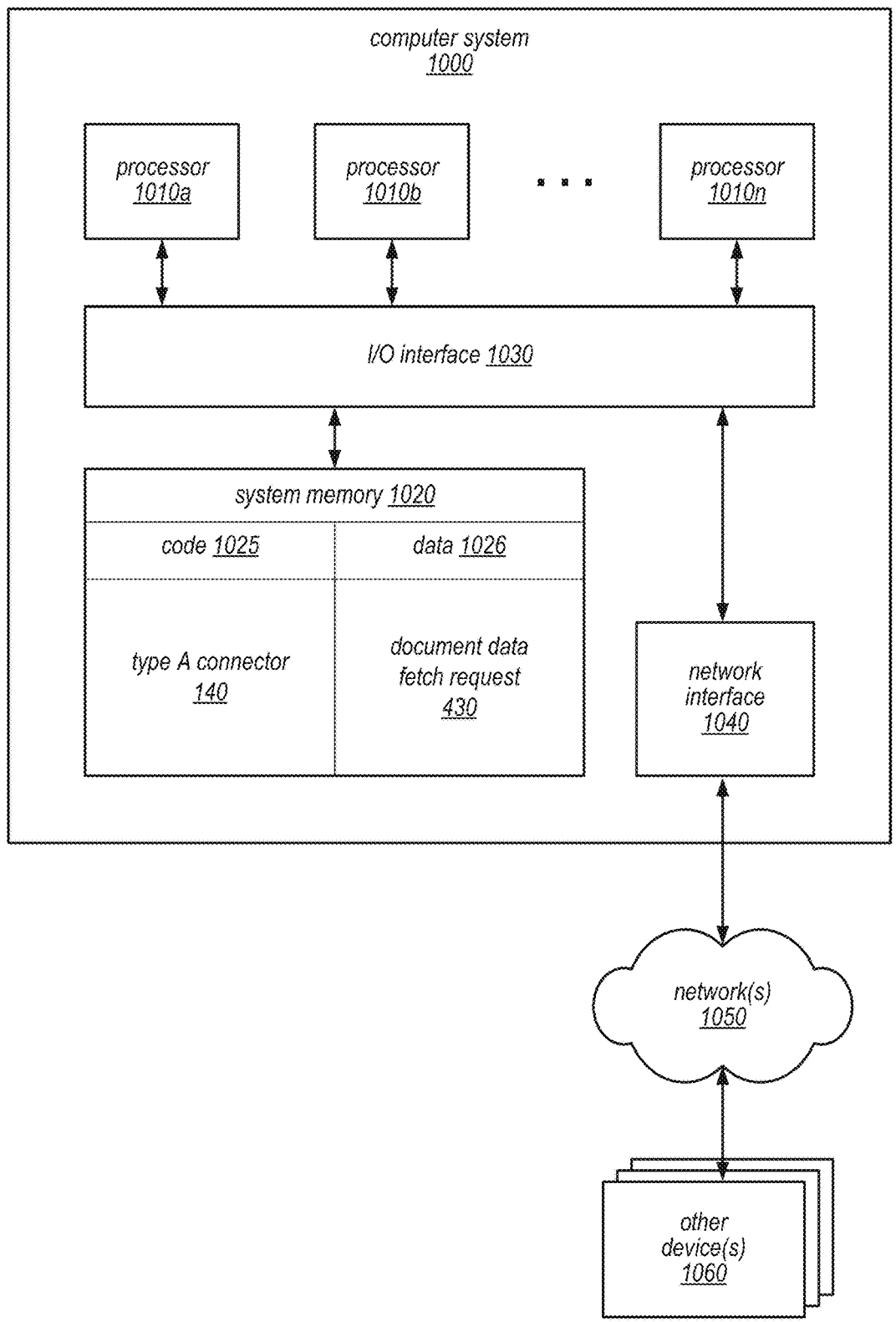
FIG. 10 is a block diagram illustrating an example computer system that can be used to implement one or more portions of a SQL database system that performs SQL queries on a non-SQL document store and treats data in a single document as multiple table rows, according to some embodiments.

FIG. 10 is a block diagram illustrating an example computer system that can be used to implement one or more portions of a SQL database system that performs SQL queries on a non-SQL document store and treats data in a single document as multiple table rows, according to some embodiments. For example, the computer system 1000 may be used to implement one or more components of the SQL database system 100 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010. These processors 1010 may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement the type A connector 140, as discussed. The system memory 1020 may also be used to store data 1026 needed or produced by the executable instructions. For example, the in-memory data 1026 may be used to store a document data fetch request 430, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system comprising:
   one or more computer devices that implement a structured query language (SQL) database system, comprising:
   a SQL query engine configured to:
   use different types of connectors to perform received SQL queries on a non-SQL document store, including:
   a first connector that treats data within an individual document in the non-SQL document store as multiple table rows, and
   a second connector that treats individual documents in the non-SQL document store as individual table rows;
   dynamically load the first connector into memory to establish a first connection to the non-SQL document store in response to a first connection request, wherein the first connector is selected based on a connection parameter of the first connection request;
   receive a first SQL query to access the non-SQL document store over the first connection and parse the first SQL query;
   instruct the first connector to fetch data from a first document in the non-SQL document store according to the first SQL query, including multiple objects stored in the first document;
   format the data fetched from the first document and return the data as response to the first SQL query;
   dynamically load the second connector into memory to establish a second connection to the non-SQL document store in response to a second connection request, wherein the second connector is selected based on a connection parameter of the second connection request;
   receive a second SQL query to access the non-SQL document store over the second connection and parse the second SQL query;
   instruct the second connector to fetch data from a second document in the non-SQL document store according to the second SQL query, including an object stored in the second document; and
   format the data fetched from the second document and return the data as response to the second SQL query;
   the first connector, configured to:
   issue one or more calls over the first connection to a data access interface of the non-SQL document store to fetch the data from the first document in the non-SQL document store according to the first SQL query, wherein the one or more calls causes the non-SQL document store to:
   open the first document, wherein the first document is associated with a table specified by the first SQL query and stores the multiple objects as an array in a compressed form;
   read the multiple objects from the first document and decompress the multiple objects; and
   return the multiple objects to the SQL query engine over the first connection according to the one or more calls; and
   the second connector, configured to:
   issue one or more calls over the second connection to the data access interface of the non-SQL document store to fetch the data from the second document in the non-SQL document store according to the second SQL query, wherein the one or more calls causes the non-SQL document store to:
   open the second document, wherein the second document stores the object and represents a row in another table specified by the second SQL query; and return the object to the SQL query engine over the second connection according to the one or more calls.

2. The system of claim 1, wherein the non-SQL document store is configured to store a plurality of documents as part of the table.

3. The system of claim 2, wherein the first connector is configured to:
in response to a request to create the table, cause the non-SQL document store to create the plurality of documents.

4. The system of claim 2, wherein:
the non-SQL document store is configured to return a document identifier of the document along with the multiple objects; and
the SQL query engine is configured to include the document identifier as an attribute of returned table rows.

5. The system of claim 1, wherein:
the first connector is configured to, in response to a request to update rows in the table, send updated table rows to the non-SQL document store as updated objects; and
the non-SQL document store is configured to update the array in the document with the updated objects.

6. The system of claim 1, wherein the first connector is configured to translate a query predicate of the SQL query into a search predicate and instruct the non-SQL document store to search the array using the search predicate.

7. The system of claim 1, wherein:
the non-SQL document store is configured to return a result token that allows the first connector to scroll through returned objects in successive pages; and
the first connector is configured to scroll through the pages using the result token.

8. The system of claim 7, wherein the SQL query engine is configured to process the pages at least partly in parallel.

9. The system of claim 1, wherein:
the non-SQL document store is hosted by a platform-as-a-service provider; and
to issue the one or more calls, the first connector is configured to communicate with a service interface provided by the platform-as-a-service provider.

10. The system of claim 1, wherein the SQL query engine configured to perform SQL queries on another type of non-SQL document store using another type of connector adapted to communicate with the other type of non-SQL document store.

11. A method comprising:
executing a structured query language (SQL) query engine configured to use different types of connectors to perform received SQL queries on a non-SQL document store, including:
a first connector that treats data within an individual document in the non-SQL document store as multiple table rows, and
a second connector that treats individual documents in the non-SQL document store as individual table rows;
performing, by the SQL querying engine:
dynamically loading the first connector into memory to establish a first connection to the non-SQL document store in response to a first connection request, wherein the first connector is selected based on a connection parameter of the first connection request;
receiving a first SQL query to access the non-SQL document store over the first connection and parsing the first SQL query;
instructing the first connector to fetch data from a first document in the non-SQL document store according to the first SQL query, including multiple objects stored in the first document;
formatting the data fetched from the first document and returning the data as response to the first SQL query;
dynamically loading the second connector into memory to establish a second connection to the non-SQL document store in response to a second connection request, wherein the second connector is selected based on a connection parameter of the second connection request;
receiving a second SQL query to access the non-SQL document store over the second connection and parse the second SQL query;
instructing the second connector to fetch data from a second document in the non-SQL document store according to the second SQL query, including an object stored in the second document; and
formatting the data fetched from the second document and returning the data as response to the second SQL query;
performing, by the first connector:
issuing one or more calls over the first connection to a data access interface of the non-SQL document store to fetch the data from the first document in the non-SQL document store according to the first SQL query, wherein the one or more calls causes the non-SQL document store to perform:
opening the first document, wherein the first document is associated with a table specified by the first SQL query and stores the multiple objects as an array in a compressed form;
reading the multiple objects from the first document and decompressing the multiple objects; and
returning the multiple objects to the SQL query engine over the first connection according to the one or more calls; and
performing, by the second connector:
issuing one or more calls over the second connection to the data access interface of the non-SQL document store to fetch the data from the second document in the non-SQL document store according to the second SQL query, wherein the one or more calls causes the non-SQL document store to perform:
opening the second document, wherein the second document stores the object and represents a row in another table specified by the second SQL query; and
returning the object to the SQL query engine over the second connection according to the one or more calls.

12. The method of claim 11, further comprising the first connector causing the non-SQL document store to create a plurality of documents to store rows of the table.

13. The method of claim 12, wherein:
the non-SQL document store is configured to return a document identifier of the document along with the multiple objects; and
the method includes the first connector adding the document identifier as an attribute of returned table rows.

14. The method of claim 11, further comprising performing, by the first connector:
receiving a request to update rows in the table; and
sending the updated table rows to the non-SQL document store as updated objects.

15. The method of claim 11, further comprising the first connector translating a query predicate of the SQL query into a search predicate for the non-SQL document store.

16. The method of claim 11, wherein:
the non-SQL document store is configured to return a result token that allows the first connector to scroll through returned objects in successive pages; and
the method includes the first connector scrolling through the pages using the result token.

17. One or more non-transitory computer-accessible storage media storing program instructions that when executed on one or more processors implement:
a structured query language (SQL) query engine configured to:
use different types of connectors to perform received SQL queries on a non-SQL document store, including:
a first connector that treats data within an individual document in the non-SQL document store as multiple table rows, and
a second connector that treats individual documents in the non-SQL document store as individual table rows;
dynamically load the first connector into memory to establish a first connection to the non-SQL document store in response to a first connection request, wherein the first connector is selected based on a connection parameter of the first connection request;
receive a first SQL query to access the non-SQL document store over the first connection and parse the first SQL query;
instruct the first connector to fetch data from a first document in the non-SQL document store according to the first SQL query, including multiple objects stored in the first document;
format the data fetched from the first document and return the data as response to the first SQL query;
dynamically load the second connector into memory to establish a second connection to the non-SQL document store in response to a second connection request, wherein the second connector is selected based on a connection parameter of the second connection request;
receive a second SQL query to access the non-SQL document store over the second connection and parse the second SQL query;
instruct the second connector to fetch data from a second document in the non-SQL document store according to the second SQL query, including an object stored in the second document; and
format the data fetched from the second document and return the data as response to the second SQL query;
the first connector, configured to:
issue one or more calls over the first connection to a data access interface of the non-SQL document store to fetch the data from the first document in the non-SQL document store according to the first SQL query, wherein the one or more calls causes the non-SQL document store to:
open the first document, wherein the first document is associated with a table specified by the first SQL query and stores the multiple objects as an array in a compressed form;
read the multiple objects from the first document and decompress the multiple objects; and
return the multiple objects to the SQL query engine over the first connection according to the one or more calls; and
the second connector, configured to:
issue one or more calls over the second connection to the data access interface of the non-SQL document store to fetch the data from the second document in the non-SQL document store according to the second SQL query, wherein the one or more calls causes the non-SQL document store to:
open the second document, wherein the second document stores the object and represents a row in another table specified by the second SQL query; and
return the object to the SQL query engine over the second connection according to the one or more calls.

18. The one or more non-transitory computer-accessible storage media of claim 17, wherein the program instructions when executed on the one or more processors cause the first connector to:
in response to a request to update rows in the table, send updated table rows to the non-SQL document store as updated objects, wherein the non-SQL document store is configured to update the array in the document with the updated objects.

* * * * *